United States Patent [19]

Wolff

[11] 4,098,951

[45] Jul. 4, 1978

[54] PROCESS FOR ELIMINATING SQUEAL IN DISC BRAKES

[75] Inventor: Norwin W. Wolff, Marshfield Hills, Mass.

[73] Assignee: Interpolymer Corporation, Canton, Mass.

[21] Appl. No.: 724,508

[22] Filed: Sep. 20, 1976

[51] Int. Cl.² .............................................. B32B 15/08
[52] U.S. Cl. .................................. 428/463; 188/73.5; 252/11; 252/51.5 A; 252/56 S; 427/388 A; 427/388 C; 428/461
[58] Field of Search ....................... 427/388 A, 388 C; 428/463, 461, 500, 522; 188/73.5; 252/565, 51.5 A, 11

[56] References Cited

U.S. PATENT DOCUMENTS

| | | | |
|---|---|---|---|
| 3,455,416 | 7/1969 | Rivett | 188/73.5 |
| 3,503,918 | 3/1970 | LeSota et al. | 427/388 A |
| 3,722,634 | 3/1973 | Ogasawara et al. | 188/73.5 |
| 3,998,301 | 12/1976 | Morse et al. | 188/73.5 X |

FOREIGN PATENT DOCUMENTS

| | | | |
|---|---|---|---|
| 2,427,040 | 12/1975 | Fed. Rep. of Germany | 188/73.5 |
| 2,250,742 | 4/1974 | Fed. Rep. of Germany | 188/73.5 |
| 2,151,687 | 4/1972 | Fed. Rep. of Germany | 188/73.5 |
| 2,028,815 | 1/1971 | Fed. Rep. of Germany | 188/73.5 |

*Primary Examiner*—Harry J. Gwinnell
*Attorney, Agent, or Firm*—David E. Brook

[57] ABSTRACT

Polymeric materials are disclosed which are suitable for application to one or more metal surfaces in disc brakes to eliminate brake squeak therefrom. The preferred polymer comprises a high molecular weight acrylic copolymer containing sites for crosslinking on the main polymer chain.

4 Claims, No Drawings

PROCESS FOR ELIMINATING SQUEAL IN DISC BRAKES

BACKGROUND OF THE INVENTION

1. Field of the Invention

This invention is in the field of disc brakes, and more particularly relates to compositions which can be applied to metal surfaces of disc brakes to eliminate brake squeak.

2. Description of the Prior Art

A conventional disc brake assembly is formed from a brake support, known as a yoke or caliper, disposed along the periphery of a rotor which is connected to the axle or wheel of a motor vehicle. The brake support is fixed to a non-rotatable part of the vehicle such as the chassis or axle housing. An actuating member, generally a hydraulically shiftable piston, is axially movable perpendicular to the braking faces of the rotor to urge a brake shoe or friction pad against the rotor which causes braking. Often, a pair of friction pads are provided in juxtaposition with one another on opposite sides of the rotor so as to sandwich the rotor between them. By providing a yoke or rotor which is movable axially, or by employing a pair of hydraulically driven pistons, provision is made to drive both friction pads into contact with the rotor.

Disc brakes have received increased acceptance among car manufacturers. One problem, however, is that disc brakes tend to squeak or squeal, even when they are not applied. This squeaking has persisted despite great efforts to eliminate it in the manufacture of brakes.

Many of the attempts to solve the squeaking of disc brakes have resulted in various mechanical devices intended to be mounted directly upon the brakes. A sampling of patented mechanical devices for such use includes the following.

U.S. Pat. No. 3,429,405 describes a generally plate-like or flat body of a vibration-damping material which is interposed between a brake shoe member and piston or brake support. This body is preferably formed from a synthetic elastomer or synthetic resin, constitutes one element of a self-adjusting or remotely controllable auxiliary mechanism operating with wedge surfaces and having a wedge body displacable in the direction of convergence of the wedging surfaces by manually operable or automatic means. The wedge body is constituted of elastically compressible material which may contain reinforcing materials. Examples of such materials include neoprenes, polytetrafluoroethylene, polyurethanes and superpolyamides, advantageously reinforced with steel layers such as steel cables or woven networks.

Similarly, in U.S. Pat. No. 3,720,293, a device for eliminating brake squeal is described which is formed by interposing a supporting member made of elastic material between the brake piston and piston cylinder in such a manner which allows the piston to slide freely inside the cylinder. This is claimed to eliminate vibration of the piston during braking because the piston and piston cylinder dynamically act as one body.

A heat-resistant damping element for insertion between the brake piston and friction pad or friction pad and brake mounting is disclosed in U.S. Pat. No. 3,885,651. The proposed damping element has plastic and elastic properties, i.e., visco-elastic properties similar to those of butyl rubber, and has a covering element adjacent to the damping element with elastic properties similar to those of a metal such as steel.

U.S. Pat. No. 3,918,555 describes a strip of substantially incompressible material coated on both faces with adhesive and adapted to be interposed between a friction pad assembly and a brake support. A suitable incompressible material is stated to be a strip of aluminum.

Still another mechanical device for eliminating squealing is described in U.S. Pat. No. 3,966,026. In this patent, a noise-suppression support for the friction lining of a braking member is described which consists of a plurality of thin metallic sheets or strips contiguous to each other over their whole surface and all assembled together by gluing, welding in zones, riveting insetting in a rim or flange, etc. Many of these mechanical devices require that the basic structure of disc brakes be significantly modified which would require expensive modifications to tooling, etc. Additionally, it is not certain that such modifications would not deleteriously affect the efficiency of disc brakes. Also, such changes, even if made, would not aid in eliminating squeak from the millions of disc brakes already produced and sold.

In addition to mechanical devices, such as those described above, it has also been proposed in U.S. Pat. No. 3,455,416 to introduce a high viscosity silicone fluid, so-called "bouncing putty," between the movable part of a brake assembly and a fixed part to provide a resilient cushion therebetween. Such materials are relatively expensive and probably would be expected to wear off the coated parts in a short time.

It has also been proposed to apply polymer coatings to the metal surfaces in disc brakes. One material suggested, for example, is polyvinyl acetate plasticized with dioctyl phthalate. This particular polymer composition, however, as well as most polymer compositions, does not have the combination of unique properties required for this application. Under the tremendous temperatures and pressures generated in disc brakes, polyvinyl acetate will melt, flow and lose essentially all of its plasticizer due to evaporation.

Despite the many efforts aimed at overcoming the squeak problem associated with disc brakes, the success has been very limited. There is simply not an inexpensive yet efficacious way for the owner of an automobile, for example, to eliminate squeaking or squealing from his disc brakes.

SUMMARY OF THE INVENTION

This invention relates to polymeric compositions for eliminating squeak caused by one surface vibrating or rubbing against another. In one application, the polymeric compositions are applied to the metal surface of a disc brake friction pad to eliminate squeak generated between the friction pad and brake mounting or yoke. Such compositions can be applied during manufacture of the brakes or at any subsequent time.

Preferred polymeric compositions are high molecular weight acrylic copolymers. These are formed from a major amount of a $C_1$-$C_8$ ester of acrylic acid and a monomer which provides sites in the polymer chain at which crosslinking can occur. Such crosslinking dramatically increases the molecular weight of the polymer thereby providing the properties required to withstand the extreme environmental conditions encountered during braking.

The polymer compositions of this invention can be produced relatively inexpensively. Additionally, they can be applied to disc brakes during their manufacture, or can be supplied to consumers in the form of emulsions or solutions which are easy to apply. Most importantly, however, these polymer compositions are capable of withstanding and retaining their unique properties under extreme environmental conditions which range from the tremendous heat and pressure encountered during braking to the low temperatures which might be encountered when an automobile is operated in winter in a northern climate.

DESCRIPTION OF PREFERRED EMBODIMENTS

Polymer compositions suitable for application to metal surfaces of disc brakes to eliminate squeaking must have a combination of unique properties not found in most polymeric compositions. It is estimated that during braking, for example, temperatures of about 750° F. and pressures of up to about 1250 psi might be encountered. Therefore, suitable polymers must be thermally stable under such conditions. They must not melt or soften, and they must resist flow under such conditions. Additionally, the polymers should be resilient and not brittle, and should have the ability to recover after braking ceases. Finally, but equally important, the polymer compositions must have good low temperature properties because they can be exposed to low temperatures, such as $-15°$ F., both during use and non-use.

Among the physical properties required, is a very high molecular weight. This is partially provided by the crosslinking which occurs during polymerization or use, or both. To be suitable, polymers must have a molecular weight of at least about one million, and preferably higher. Such high molecular weights provide toughness, thermal stability and resistance to flow.

Specific polymers which are suitable include high molecular weight, crosslinkable, acrylic copolymers. Such polymers contain at least about 50%, and preferably up to about 80%, of one or more $C_1-C_8$ esters of acrylic acid. The preferred esters are ethyl acrylate and propyl acrylate, or mixtures of these, because they provide outstanding low temperature properties to the overall copolymer.

These acrylic copolymers also must contain from at least about 1%, and preferably from about 5 to about 10%, of a monomer which provides sites at which crosslinking can occur. Crosslinkable monomers can be included in the main polymer chain, or they can be external to it.

A first class of suitable crosslinkable monomers is the class of vinyl-unsaturated monomers containing functional groups capable of crosslinking. These include, for example, acrylamides or methacrylamides which are substituted at their nitrogen atom with functional groups which provide crosslinking sites. A particularly preferred monomer in this class is N-methylolacrylamide, which has an outstanding ability to crosslink with itself or with other appropriate reactive sites through its hydroxymethyl group by means of heat, acid, or free radical catalysts. Other suitable vinyl monomers containing appropriate groups include hydroxyl functional acrylates and methacrylates, such as hydroxyethylacrylate or hydroxypropylmethacrylate; carboxyl functional acrylates or methacrylates, such as acrylic or methacrylic acid; etc.

A second class of suitable monomers for providing the crosslinking sites is the class of monomers that are polyfunctional with respect to their vinyl unsaturation. These include divinyl compounds such as divinyl benzene; dimethacrylates or diacrylates such as diethylene glycol dimethacrylate, triethylene glycol dimethacrylate and their corresponding acrylates; trimethacrylates such as glyceryl trimethacrylate; and higher methacrylates or acrylates such as pentaerythritol tetramethacrylate. Di- or tri-allyl compounds are also suitable.

The aforementioned crosslinkable monomers contain vinyl unsaturation so that they become part of the main polymer chain. It is also possible to add crosslinking agents which do not become part of the main polymer backbone. An outstanding example of a monomer in this class is hexamethoxymethylmelamine, which is sold as a crosslinking agent under the tradenames CYMEL by American Cyanimide. Hexamethoxymethylmelamine is reactive, usually under acid catalyses, with pendant functional groups such as hydroxyl or carboxyl which are pendant on a main polymer chain.

Another alternative technique to obtaining suitable crosslinking sites on the main polymer chains is to treat a monomer contained within the polymer to produce such crosslinkable functional groups. For example, acrylamide can be included in the main polymer chain and then later hydrolyzed using alkalis to produce pendant hydroxy groups or it can be treated with formaldehyde to produce pendant methylol groups. These groups can then be reacted by the techniques described above or other well known techniques for crosslinking polymers through such pendant groups.

Although several different suitable monomers containing crosslinkable sites as well as techniques for including them in the main polymer chain, have been presented above, there are others. Those skilled in the art will know, or be able to ascertain using no more than routine experimentation, other equivalent monomers capable of providing crosslinkable sites on the main polymer chain.

Acrylic copolymers may, of course, also contain other ethylenically unsaturated monomers, such as $C_1-C_8$ methacrylates, styrene, acrylonitrite, vinyl chloride, vinyl acetate, vinylidene chloride, itaconates, aconitates, etc. Such additional monomers would not be expected to significantly detract from the properties of acrylic copolymers containing the two main monomers, and in many cases may provide improved properties.

Acrylic copolymers suitable for application in disc brakes can be produced using standard emulsion or suspension polymerization technology. Emulsion polymerization is preferable because it is characteristically more rapid and tends to result in average molecular weights which are higher than with other techniques. As is known, emulsion polymerizations are usually carried out using a continuous aqueous phase containing suitable surfactants. The most important aspect of the polymerization is that control be maintained over the reaction so that the polymer achieves the high molecular weight required.

Standard free radical initiators, including organic peroxides such as benzoyl peroxide, are utilized. Other initiators include organic hydroperoxides, N-nitrosoacylanilides, p-bromobenzenediazo hydroxide, triphenylmethylazobenzene, aliphatic azobisnitriles, such as azo-bis-isobeuteronitrile, etc., can all be used.

Other polymer compositions can be used. Such polymers must not decompose, must be otherwise stable, and must not flow to any significant extent at temperatures up to about 750° F. and pressures of up to about 1250 p.s.i. Certain silicone resins, such as poly (dimethyl siloxanes) and compounded modifications thereof containing diatomaceous earth, benzoyl peroxide, 2, 5-di-t-butylquinone and/or other components commonly used in silicone rubber compounding would be suitable. Also, some rubbers such as vulcanized isoprene, isobutylene, polypropylene, or nitrile rubbers such as ABS are also suitable.

To facilitate application of the copolymer compositions, a viscosity-increasing agent can be added until the viscosity reaches a value of at least about 5000 centiposes at 72° F. Preferably, the viscosity is increased until it is between about 40,000 and 50,000 centiposes at 72° F. Suitable viscosity-increasing agents include polyacrylates, such as amonium polyacrylate; carboxyethyl cellulose and hydroxyethyl cellulose; polyvinyl alcohol; and others.

The polymer compositions can be applied to any surface which contacts another surface and results in squeaking or squealing. Typically, in conventional disc brakes, compositions are applied to the metallic surfaces of the inboard and outboard friction pads which are known to vibrate against the metal yoke of such drums to produce squeaking. The compositions can be applied during manufacture of the disc brakes, or at any time thereafter.

EXAMPLE 1

Polymeric composition suitable for eliminating squealing in disc brakes can be formulated as follows:

2350 Pounds of water are charged into a 500 gallon polymer reactor with an agitator and heated to 50° C. The total monomer charge consists of 598 pounds of ethyl acrylate, 1170 pounds of butyl acrylate, 72 pounds of hydroxypropylmethacrylate, and 21 pounds of methylolacrylamide. One-half percent of sodium lauryl sulfate, an anionic surfactant, 5% of Nonoxynol-10, a nonionic surfactant, and 2.5 pounds of sodium persulfate, a heat-activatable free radical initiator, are also added to the reactor.

Twenty percent of the monomer charge is added to the heated water. The remaining 80% is metered incrementally into the reactor over a 2-hour period. When the entire monomer charge has been added, the reaction mixture is heated to 80° C. and maintained at this temperature for 1 hour. After this, the reaction is complete and the batch is cooled to room temperature.

After cooling, 10 pounds of ammonium polyacrylate, a viscosity-increasing agent, is added. This raises the viscosity of the product to about 45,000 centiposes at 72° F. measured on a Brookfield viscometer.

This product is suitable for direct application to metal surfaces of disc brakes to dampen vibrations and eliminate squealing therein.

Those skilled in the art will recognize many equivalents to the specific embodiments described herein. For example, although the description herein has been in terms of disc brakes, there are many other metal or other surfaces to which the compositions could be applied to eliminate squeaking. These equivalents are part of this invention and are intended to be covered by the following claims.

What is claimed is:

1. A method for reducing squeak in disc brakes caused by contact between the metal surfaces of the friction pad and brake support comprising applying a high molecular weight, thermally stable polymer composition to at least one of said metal surfaces in an amount sufficient to eliminate squeak, said polymer composition comprising a high molecular weight acrylic copolymer containing at least about 50% of a $C_1$-$C_8$ ester of acrylic acid and at least about 1% of a monomer providing crosslinkable sites on the main polymer chain.

2. A method of claim 1 wherein said monomer providing crosslinkable sites is a monomer containing vinyl unsaturation and pendant functional groups which provide crosslinkable sites.

3. A method of claim 2 wherein said monomer providing crosslinkable sites comprises methylolacrylamide.

4. A method of claim 1 wherein said high molecular weight thermally stable polymer composition is applied to the metal surface of the disc brake friction pad.

* * * * *